US012600261B2

(12) United States Patent
Mclaughlin et al.

(10) Patent No.: US 12,600,261 B2
(45) Date of Patent: Apr. 14, 2026

(54) INTEGRATION BETWEEN UNMANNED AERIAL SYSTEM AND UNMANNED GROUND ROBOTIC VEHICLE

(71) Applicant: Asylon, Inc., Philadelphia, PA (US)

(72) Inventors: Brent Mclaughlin, Savage, MD (US); Damon C. Henry, Philadelphia, PA (US); Adam I. Mohamed, Philadelphia, PA (US); Justin Kantor, Morrisville, PA (US); David Dones, West Chester, PA (US); Michael Quiroga, Cocoa Beach, FL (US)

(73) Assignee: Asylon, Inc., Philadelphia, PA (US)

( * ) Notice: Subject to any disclaimer, the term of this patent is extended or adjusted under 35 U.S.C. 154(b) by 841 days.

(21) Appl. No.: 17/657,690

(22) Filed: Apr. 1, 2022

(65) Prior Publication Data

US 2023/0023246 A1 Jan. 26, 2023

Related U.S. Application Data

(60) Provisional application No. 63/170,087, filed on Apr. 2, 2021.

(51) Int. Cl.

| | |
|---|---|
| *B60L 53/80* | (2019.01) |
| *B60L 53/38* | (2019.01) |
| *B60L 53/66* | (2019.01) |
| *B64C 39/02* | (2023.01) |
| *B64U 50/19* | (2023.01) |
| *G05D 1/00* | (2024.01) |

(52) U.S. Cl.

CPC .............. *B60L 53/80* (2019.02); *B60L 53/66* (2019.02); *G05D 1/0088* (2013.01); *G05D 1/0202* (2013.01); *G05D 1/021* (2013.01);

*B60L 53/38* (2019.02); *B60L 2200/10* (2013.01); *B60L 2240/72* (2013.01); *B64C 39/024* (2013.01); *B64U 50/19* (2023.01)

(58) Field of Classification Search
CPC ..... B60S 5/06; B60L 53/80; B64U 50/30–39; B64U 2200/10
See application file for complete search history.

(56) References Cited

U.S. PATENT DOCUMENTS

| | | | |
|---|---|---|---|
| 9,783,075 B2 | 10/2017 | Henry et al. | |
| 9,969,285 B2 | 5/2018 | Henry et al. | |
| 10,301,022 B1 * | 5/2019 | Scott ...................... | B60L 53/00 |
| 10,328,805 B1 * | 6/2019 | Wyrobek ................ | B60L 53/00 |

(Continued)

FOREIGN PATENT DOCUMENTS

| | | | | |
|---|---|---|---|---|
| DE | 102009019384 A1 * | 11/2010 | ............... | B60K 1/04 |
| WO | WO 2022/213125 | 10/2022 | | |

OTHER PUBLICATIONS

DE-102009019384-A1 Machine Translation (Year: 2025).*

*Primary Examiner* — David V Henze

(74) *Attorney, Agent, or Firm* — Levine Bagade Han LLP

(57) ABSTRACT

Integration between unmanned aerial system and unmanned ground robotic vehicle are disclosed herein. One variation of a robotic system may generally comprise an unmanned aerial vehicle (UAV), an unmanned ground vehicle (UGV), and a base station configured to receive the UAV and replace a spent power supply cartridge from the UAV and further having a charging mechanism configured to wirelessly transfer power to the UGV when the UGV is positioned in proximity to the charging pad.

16 Claims, 8 Drawing Sheets

(56)  References Cited

U.S. PATENT DOCUMENTS

| 10,538,340 | B1 * | 1/2020 | Roup | ....................... G08G 5/26 |
| 2007/0131822 | A1 | 6/2007 | Stallard | |
| 2018/0037125 | A1 | 2/2018 | Penilla et al. | |
| 2018/0141453 | A1 * | 5/2018 | High | ....................... B60L 53/37 |
| 2018/0222339 | A1 * | 8/2018 | Henry | ..................... B60L 53/36 |
| 2019/0009756 | A1 * | 1/2019 | Jacobs | .................... B60L 53/80 |
| 2019/0025830 | A1 | 1/2019 | O'Brien | |
| 2020/0142433 | A1 | 5/2020 | Venturelli | |
| 2020/0324412 | A1 | 10/2020 | Whitman et al. | |

* cited by examiner

INTEGRATION BETWEEN UNMANNED AERIAL SYSTEM AND UNMANNED GROUND ROBOTIC VEHICLE

CROSS-REFERENCE TO RELATED APPLICATIONS

This application claims the benefit of priority to U.S. Prov. App. 63/170,087 filed Apr. 2, 2021, which is incorporated herein by reference in its entirety.

FIELD OF THE INVENTION

The present invention is related to the integration of unmanned aerial vehicles and unmanned ground vehicles. More particularly, the present invention is related to the integration of unmanned aerial vehicles and unmanned ground vehicles which may be combined into a single platform.

BACKGROUND OF THE INVENTION

Unmanned Aerial Vehicles (UAVs) are increasingly being used for commercial applications. Examples include, but are not limited to, security, inspections of railway lines, inspection of electrical power lines, monitoring of quarry sites and construction sites. Larger than consumer UAVs, commercial UAVs are commonly powered by, but not limited to, batteries. Currently, one limitation of the range and capabilities for commercial UAVs is their ability to handle weather (wind and precipitation). With the latest breakthroughs in Unmanned Ground Vehicles (UGVs including any movement mechanism such as legged, wheeled, tracked, etc., and may also include Quadrupedal Unmanned Ground Vehicles (Q-UGV)), the pairing of a UAV along with a UGV, launched through the same platform, provides an increased list of capabilities and missions sets. Depending upon the application, specific to real-time events (weather, terrain, mission type) the best suited vehicle could be deployed to perform the mission, or both could be deployed in coordination with each other to provide better performance in all scenarios.

Currently, the primary limitation of the range and capabilities for commercial UAVs and UGVs is battery technology. With the latest breakthroughs and higher power densities, UAVs and UGVs are capable of longer mission times with a useable payload. Current UAVs and UGVs require manual exchange of these power systems, requiring a man in the loop for every flight or mission. While requiring a man in the loop for the UAV and UGV is sufficient for consumer use, battery technology and the automation of exchanging them is a limiting factor to the commercial realization and wide-spread use of UAVs and UGVs.

Furthermore, UAVs and UGVs are typically operated as separate systems and there is no system which can combine the command-and-control of both UAVs and UGVs into a single platform which can be controlled by a single operator. This combination allows for a single operator to remain focused on the command and control of the mission wholistically, as opposed to learning how to operate disparate systems that are use case dependent.

SUMMARY OF THE INVENTION

One example of a combination UAV and UGV system may utilize a base station which may incorporate a landing zone for a UAV as well as several interior bays which may hold replacement power supply swap cartridges which can be automatically exchanged for spent cartridges from the UAV positioned upon the landing zone of the base station. A UGV may integrated with the base station such that the command-and-control function may be provided by a controller positioned within the base station or remotely from the base station for coordinating launch and/or recovery missions. The base station may provide the launch and/or recovery missions to either the UAV alone, UGV alone, or to both the UAV and UGV in an integrated mission. The base station may also provide a replaceable power supply for the UGV or may provide for a charging station through which the UGV may be powered or recharged.

While the base station for the UAV may be combined with a charging station for the UGV into a single charging station, the UGV charge station may also be physically separated so that the UAV charging station may be physically separated from the UGV charging station which may also be stand-alone. Even with the UAV and UGV charging stations physically separated, they may still be linked through the single command and control system so that they remain in communication with one another, e.g., wirelessly or wired.

The combined UAV and UGV system may provide a single command-and-control platform which may allow for the response to, e.g., an external alarm or internet-of-things (IoT) trigger, by deploying the UAV or UGV separately or simultaneously to an area of interest along pre-programmed routes. Video and telemetry from both the UAV and UGV may be streamed, e.g., in near real-time, to an operator at a central controller, as described in further detail herein. Moreover, while the UAV and UGV may follow predetermined waypoints and/or routes, an operator may optionally control one or both of the UAV and UGV manually. Upon completion of a mission, the UAV and/or UGV may be programmed to autonomously return back to the base station for docking and recharging.

As the base station may be configured for charging both the UAV and UGV simultaneously, the base station may be powered by an external power source. The external power source may be used to power battery charging bays contained within the base station for holding and charging swappable battery cartridges contained within each of the bays for the automated swapping of a depleted power supply from the UAV for a charged power supply from within the base station.

A charging pad such as a wireless transducer configured to remotely transmit electromagnetic energy for charging may be electrically coupled to the base station such that the charging pad is located to allow for the UGV to position itself into proximity to the base station and charging pad for recharging when "docked". Other variations may include wired charging where the UGV may be physically coupled to a charging pad, port, or other electrical coupling.

Because a single system may provide for command-and-control of both the UAV and UGV, a single controller incorporating the controller software may be in wireless communication with both. The controller may accordingly be configured to incorporate any number of various functions for controlling both UAV and UGV. The controller may respond according to the particular functionality or mission required.

In the event that the UAV and UGV are in a standby mode docked at the base station or on another mission or patrol, the controller may determine the mission requirements and either automatically launch or divert the UAV, launch or divert the UGV, or launch or divert both UAV and UGV. Alternatively, the controller may determine the mission requirements and alert a human operator who may then either affirm or selectively affirm the launch or diversion of the UAV and/or UGV or take control of either the UAV or UGV.

In order to enable command-and-control of the UGV as well as to enable communication and transmission of data such as streaming of telemetry and video from the UGV to the base station or remote server, a processor or computer may be integrated upon the UGV and may be powered directly by the UGV on-board power supply. The processor or computer may enable the receipt of data such as video data from the on-board camera payload and telemetry data from central control computer of the UGV to be routed via an on-board network switch for wireless transmission, e.g., via an on-board LTE cellular modem, to communicate with the base station or remote server.

The flight controller and camera payload of UAV may communicate via encrypted RF communication wirelessly through an on-board wireless RF radio directly with a wireless RF radio contained within the base station. The base station may further incorporate a video encoder which may receive video data transmitted from the camera payload of the UAV. The video encoder may transmit the video data to the on-board computer in the base station and specifically to a server contained within that utilizes Transport Layer Security (TLS) certificates to establish secure web sockets to enable encrypted communications. The on-board computer may also contain an API server which may also receive the data received from the flight controller of the UAV.

With the base station located in the field in proximity to the UAV (and UGV), the local server may enable wireless encrypted communication via the TLS web sockets to a cloud-based server which may be accessed and operated from anywhere in the world so long as the operator has an internet connection. The cloud-based server may receive the telemetry and video data from the server within the base station via a server which may receive the data into a digital video recording (DVR) application in the cloud-based server that receives the video data from the field server and records it to secure storage for streaming and playback. The server may also communication with a cloud-based backend server that sends and receives data between the frontend application through encrypted communications from a remotely located web browser which may be loaded by an operator. The backend server may also communicate with a cloud-based database. In this manner, an operator located anywhere in the world may communicate command-and-control data as well as receive telemetry and video data from a remote UAV by communicating through the cloud-based server and field based on-board server located locally within the base station.

With this architecture, the UGV may similarly communicate with the remote operator utilizing the on-board computer integrated with the UGV. With the integrated computer, the on-board server may communicate with the integrated API server which may interface directly with the central computer of the UGV. The telemetry and video data from the UGV may be communicated through the server of integrated computer directly with the cloud-based server which may then enable a remote operator to provide command-and-control to the UGV as well as receive the telemetry and video data through the frontend application. Alternatively, the UGV may communicate directly with the API server and server within the base station which may in turn communicate with the cloud-based server.

One variation of a robotic system may generally comprise an unmanned aerial vehicle (UAV), an unmanned ground vehicle (UGV), and a base station configured to receive the UAV and replace a spent power supply cartridge from the UAV and further having a charging mechanism configured to transfer power to the UGV (wirelessly or wired) when the UGV is positioned in proximity to the charging pad.

One variation of a method for monitoring an area with the UAV or UGV may generally comprise receiving an alert from a remote alarm, determining one or more mission requirements based on the alert, communicating with a UAV and a UGV via a base station, and deploying the UAV alone, the UGV alone, or the UAV and UGV simultaneously.

BRIEF DESCRIPTION OF THE DRAWINGS

The detailed description is described with reference to the accompanying figures.

DETAILED DESCRIPTION OF THE INVENTION

An unmanned system which can provide command and control support as well as supply power via an automated power supply replacement system may incorporate both an Unmanned Aerial Vehicle (UAV) such as a drone and an automated Unmanned Ground Vehicle (UGV), including Quadrupedal Unmanned Ground Vehicles (Q-UGV), which may include any variation of movement mechanism such as legged, wheeled, tracked, etc. vehicle which may be fully or partially automated.

Examples of UAVs or UAV systems which may be used with any of the embodiments described here are described further detail in U.S. Pat. Nos. 9,969,285 and 9,783,075 and U.S. Pat. Pub. 2018/0222339, each of which is incorporated herein by reference in its entirety and for any purpose. Examples of UGVs or UGV systems which may also be used with any of the embodiments described here may include UGV and Q-UGV systems from Ghost Robotics Corporation (Philadelphia, PA), Boston Dynamics, Inc. (Waltham, MA), or any number of other systems.

Figure 1A:
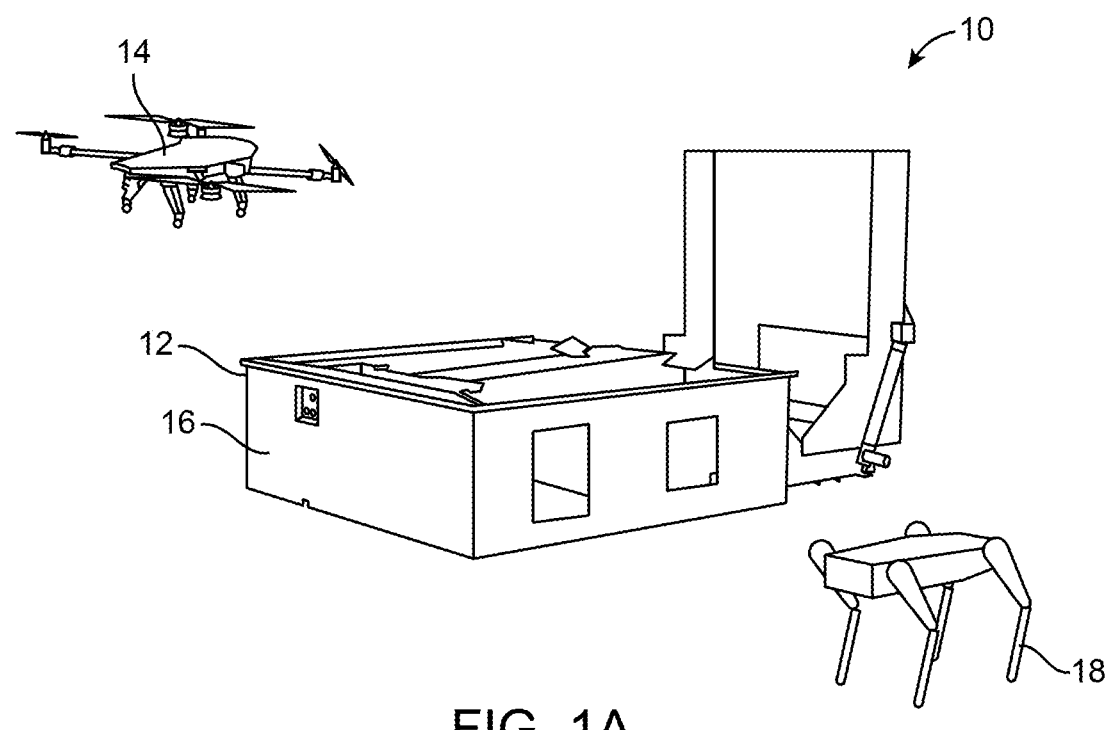
FIG. 1A illustrates a combined UAV and UGV system.
Figure 2A:
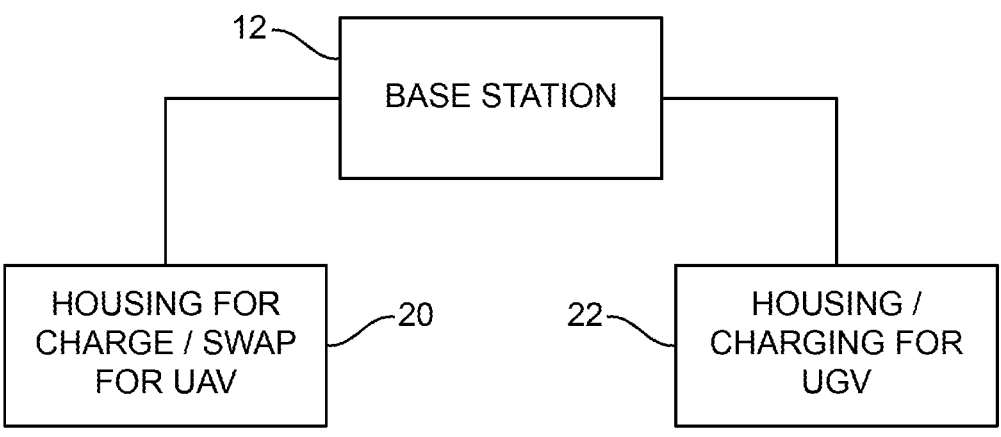
FIG. 2A illustrates a schematic diagram of how a base station common to both the UAV and UGV may be utilized.

An example of a combination UAV and UGV system 10 is illustrated in FIG. 1A which shows one variation of a base station 12 having a UAV housing 16 which may incorporate a landing zone for a UAV 14 as well as several interior bays which may hold replacement power supply swap cartridges 20 which can be automatically exchanged for spent cartridges from the UAV 14 positioned upon the landing zone of the base station 12, as illustrated in the schematic diagram of FIG. 2A. A UGV 18 such as the Q-UGV shown may be integrated with the base station 12 such that the command-and-control function may be provided by a controller positioned within the base station 12 or remotely from the base station 12 for coordinating launch and/or recovery missions, as described in further detail below. The base station 12 may provide the launch and/or recovery missions to either the UAV 14 alone, UGV 18 alone, or to both the UAV 14 and UGV 18 in an integrated mission. The base station 12 may also provide a replaceable power supply for the UGV 18 or may provide for a charging station through which the UGV 18 may be powered or recharged 22, as shown in FIG. 2A.

Figure 1B:
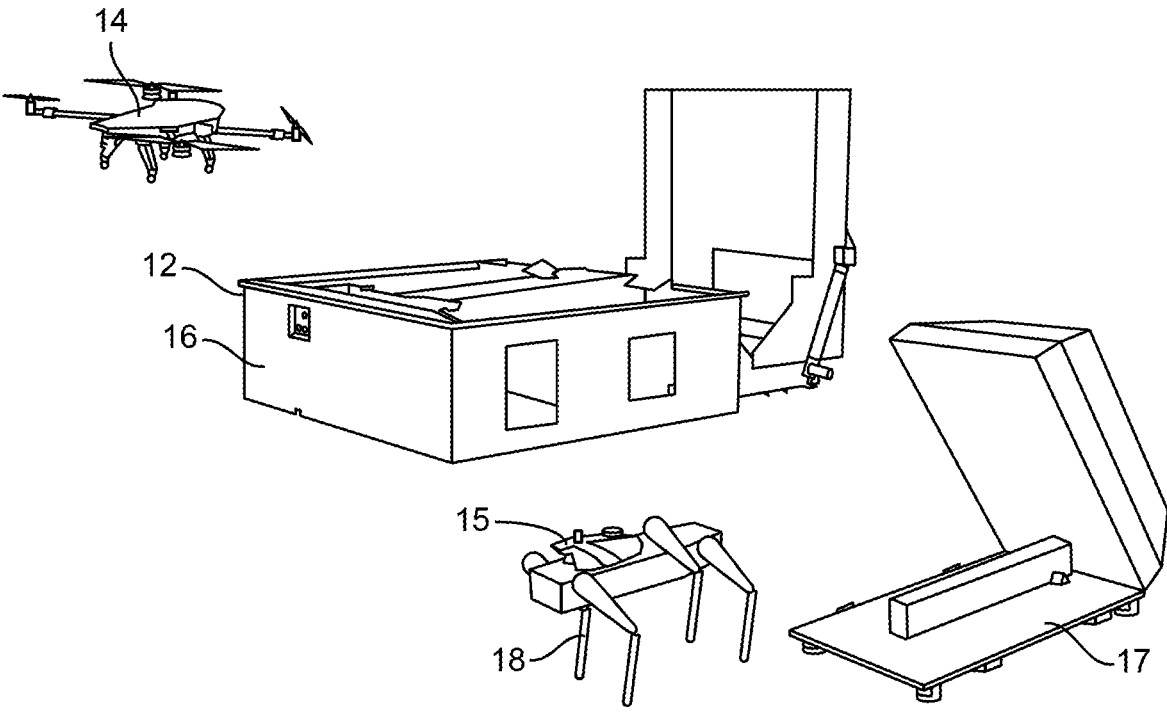
FIG. 1B illustrates another variation of a combined UAV and UGV system.

FIG. 1B illustrates another example where the UGV 18 may be powered and/or housed in a UGV housing unit 17 which is physically separated from or separatable from the base station 12. While the UGV 18 may be powered by the base station 12, the UGV housing unit 17 may be used to not only house UGV 18 but also charge the UGV 18 when not deployed. UGV housing unit 17 may incorporate one or more wireless charging pads or wired power couplings which may engage with corresponding power couplings on the UGV 18. UGV 18 may also be seen incorporating a computer module 15 integrated with the UGV 18 and which may enable the UGV 18 to receive and transmit data to and/or from base station 12 or another remote station or controller.

The combined UAV and UGV system 10 may provide a single command-and-control platform which may allow for the response to, e.g., an external alarm or internet-of-things (IoT) trigger, by deploying the UAV 14 or UGV 18 separately or simultaneously to an area of interest along pre-programmed routes. Video and telemetry from both the UAV 14 and UGV 18 may be streamed, e.g., in near real-time, to an operator at a central controller, as described in further detail herein. Moreover, while the UAV 14 and UGV 18 may follow predetermined waypoints and/or routes, an operator may optionally control one or both of the UAV 14 and UGV 18 manually. Upon completion of a mission, the UAV 14 and/or UGV 18 may be programmed to autonomously return back to the base station 12 for docking and recharging. Examples of a UAV system for monitoring and/or alerting an operator based on an external alarm or IoT trigger which may be implemented in combination with UGV 18, as described herein, are shown and described in further detail in U.S. patent application Ser. No. 17/185,495 filed Feb. 25, 2021, which is incorporated herein by reference in its entirety and for any purpose.

Figure 2B:
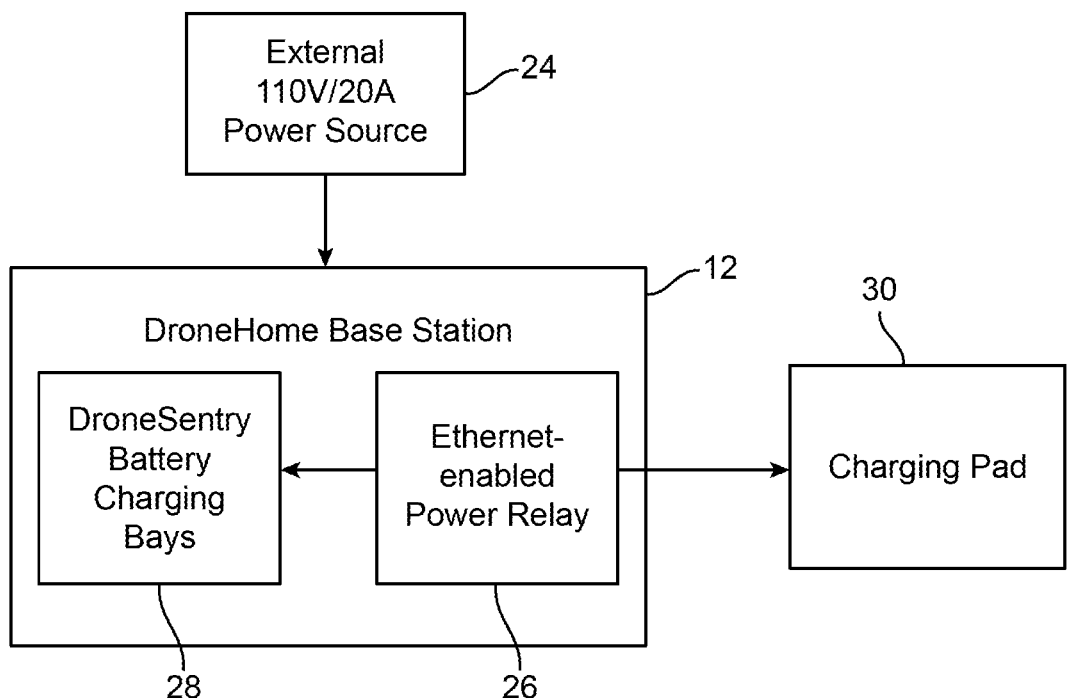
FIG. 2B illustrates a schematic diagram of one variation of the electrical architecture for providing power to both a UAV and UGV.

As the base station 12 may be configured for charging both the UAV 14 and UGV 18 simultaneously, the base station 12 may be powered by an external power source 24 (e.g., standard 110V/20 A outlet), as schematically illustrated in the electrical architecture diagram of FIG. 2B. The external power source 24 may be used to power battery charging bays 28 (e.g., six or more bays) contained within the base station 12 for holding and charging swappable battery cartridges contained within each of the bays 28 for the automated swapping of a depleted power supply from the UAV 14 for a charged power supply from within the base station 12.

While the base station for the UAV 14 may be combined with a charging pad 30 for the UGV 18 into a single charging station, the UGV charge station may also be physically separated so that the UAV charging station may be physically separated from the UGV charging station which may also be standalone. Even with the UAV and UGV charging stations physically separated, they may still be linked through the single command and control system so that they remain in communication with one another, e.g., wirelessly or wired.

In other variations, the base station 12 may also hold and/or charge swappable battery cartridges within bays in the base station 12 for swapping out with a depleted power supply from the UGV 18 as well. In such an embodiment, an exchange mechanism (e.g., an automated robotic arm) may remove a depleted power supply from the UGV 18 and exchange it for a charged power supply stored within the base station 12.

A charging pad 30 such as a wireless transducer configured to remotely transmit electromagnetic energy for charging may be electrically coupled to the base station 12 such that the charging pad 30 is located to allow for the UGV 18 to position itself into proximity to the base station 12 and charging pad 30 for recharging when "docked". Such remote charging pads 30 may be provided through sources such as WiBotic Inc. (Seattle, WA). A power relay 26 which may be optionally ethernet-enabled may be provided within the base station 12 for electrically coupling to the battery charging bays 28 and/or charging pad 30 to optionally enable for a remotely located operator to control or monitor the charging state of the UAV 14 or UGV 18 when docked to the base station 12 or charging pad 30 for recharging.

Figure 3:
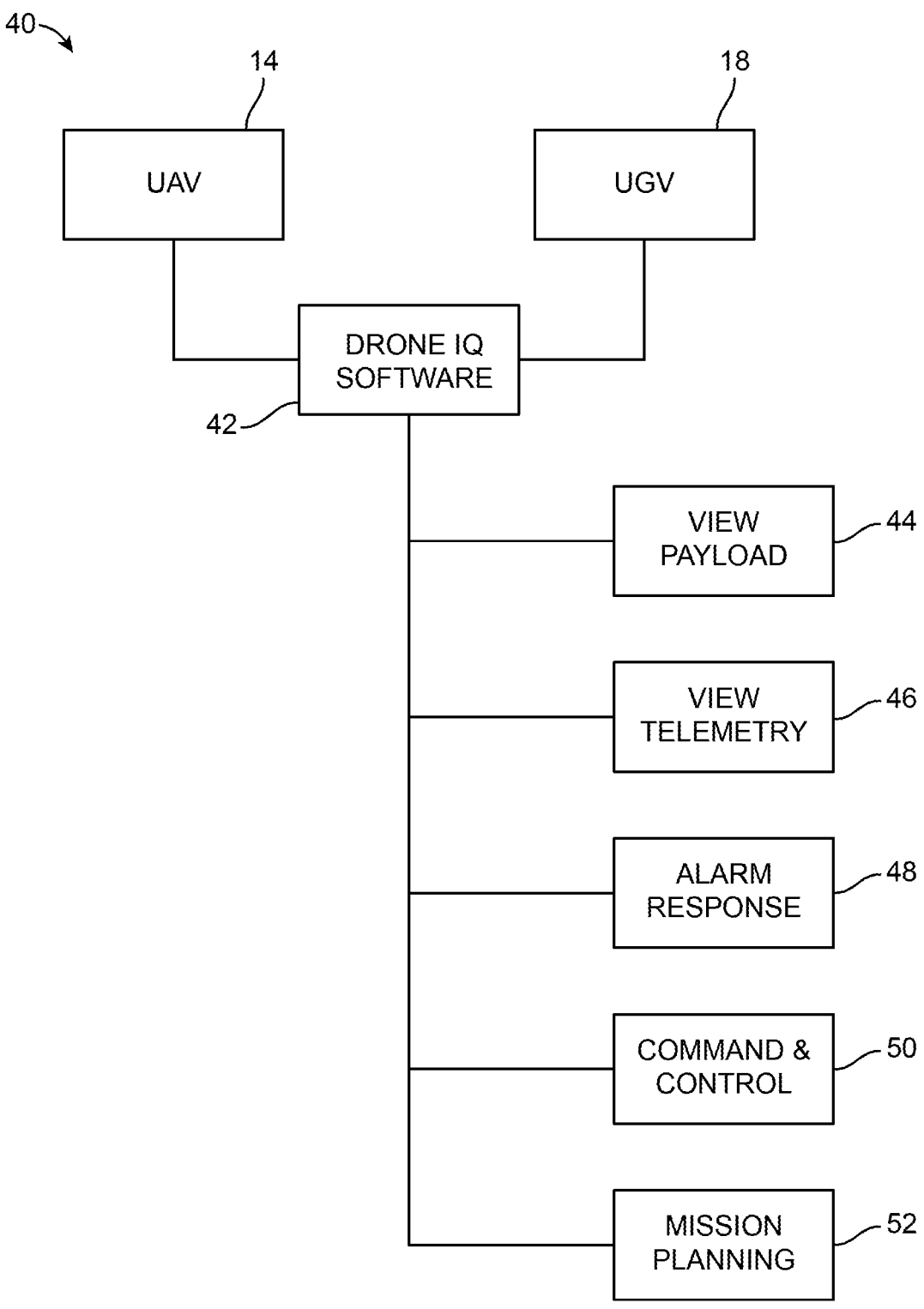
FIG. 3 illustrates a schematic diagram of a single system which may provide for command-and-control of both the UAV and UGV.

Because a single system may provide for command-and-control of both the UAV 14 and UGV 18, a single controller 42 incorporating the controller software may be in wireless communication with both, as illustrated in the schematic diagram 40 of FIG. 3. The controller 42 may accordingly be configured to incorporate any number of various functions for controlling both UAV 14 and UGV 18. For example, the controller 42 may view the payload 44, view telemetry data 46, provide an alarm response 48 which may be preprogrammed, provide for command-and-control 50 functionality, as well as provide for various mission planning 52 options for UAV 14 and UGV 18 individually or for both.

Figure 4:
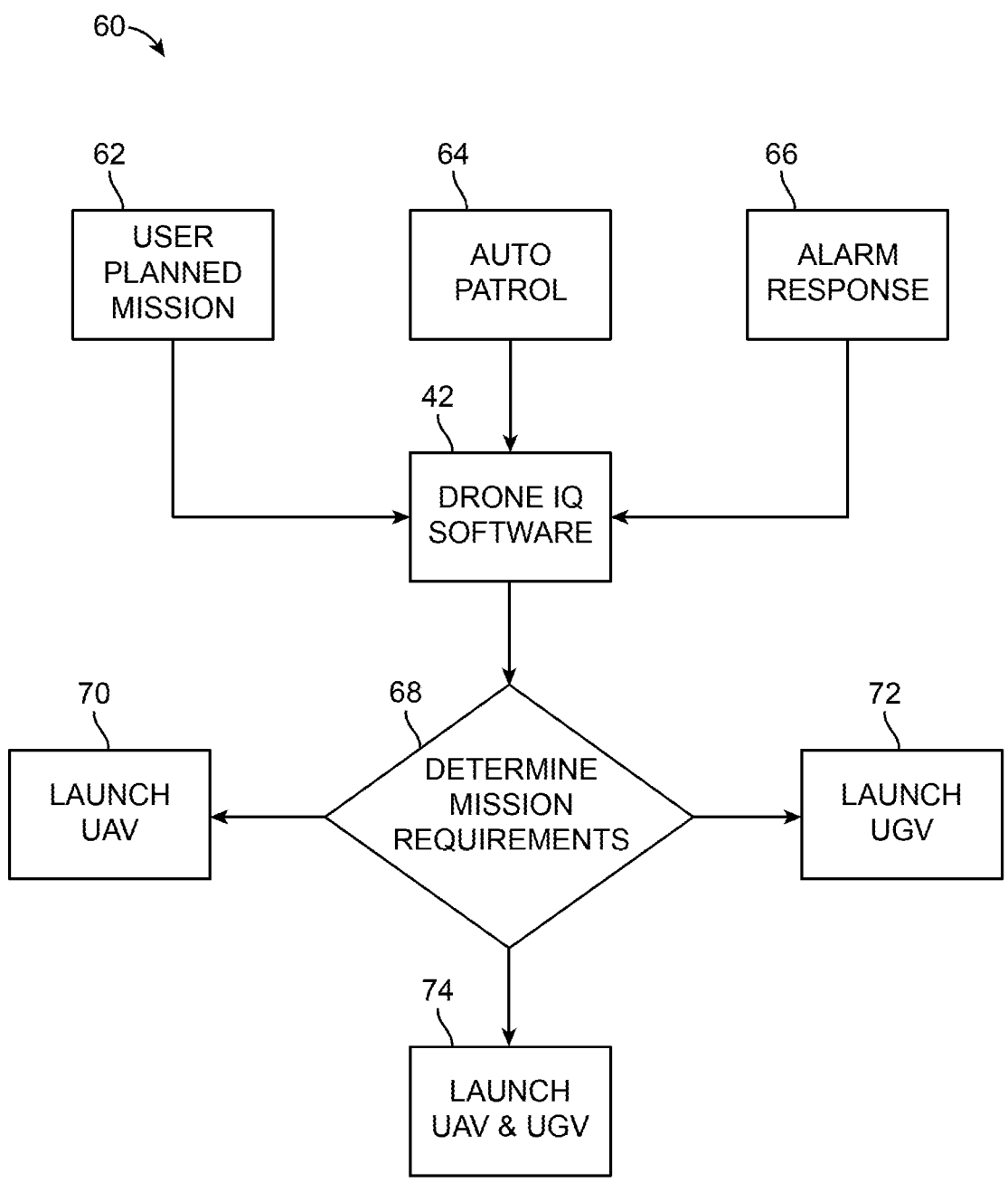
FIG. 4 illustrates a schematic diagram for how the controller may respond for various missions where the UAV and UGV are diverted automatically or affirmatively controlled to respond to an alarm or alert at a remote location.

The controller 42 may respond according to the particular functionality or mission required. For example, FIG. 4 illustrates a schematic diagram 60 for how the controller 42 may respond for user planned missions 62, auto patrols 64 where the UAV 14 and UGV 18 follow predetermined mission profiles, and alarm responses 66 when the UAV 14 and UGV 18 are diverted automatically or affirmatively controlled to respond to an alarm or alert at a remote location.

In the event that the UAV 14 and UGV 18 are in a standby mode docked at the base station 12 or on another mission or patrol, the controller 42 may determine the mission requirements 68 and either automatically launch or divert 70 the UAV 14, launch or divert 72 the UGV 18, or launch or divert 74 both UAV 14 and UGV 18. Alternatively, the controller 42 may determine the mission requirements 68 and alert a human operator who may then either affirm or selectively affirm the launch or diversion of the UAV 14 and/or UGV 18 or take control of either the UAV 14 or UGV 18.

Figure 5:
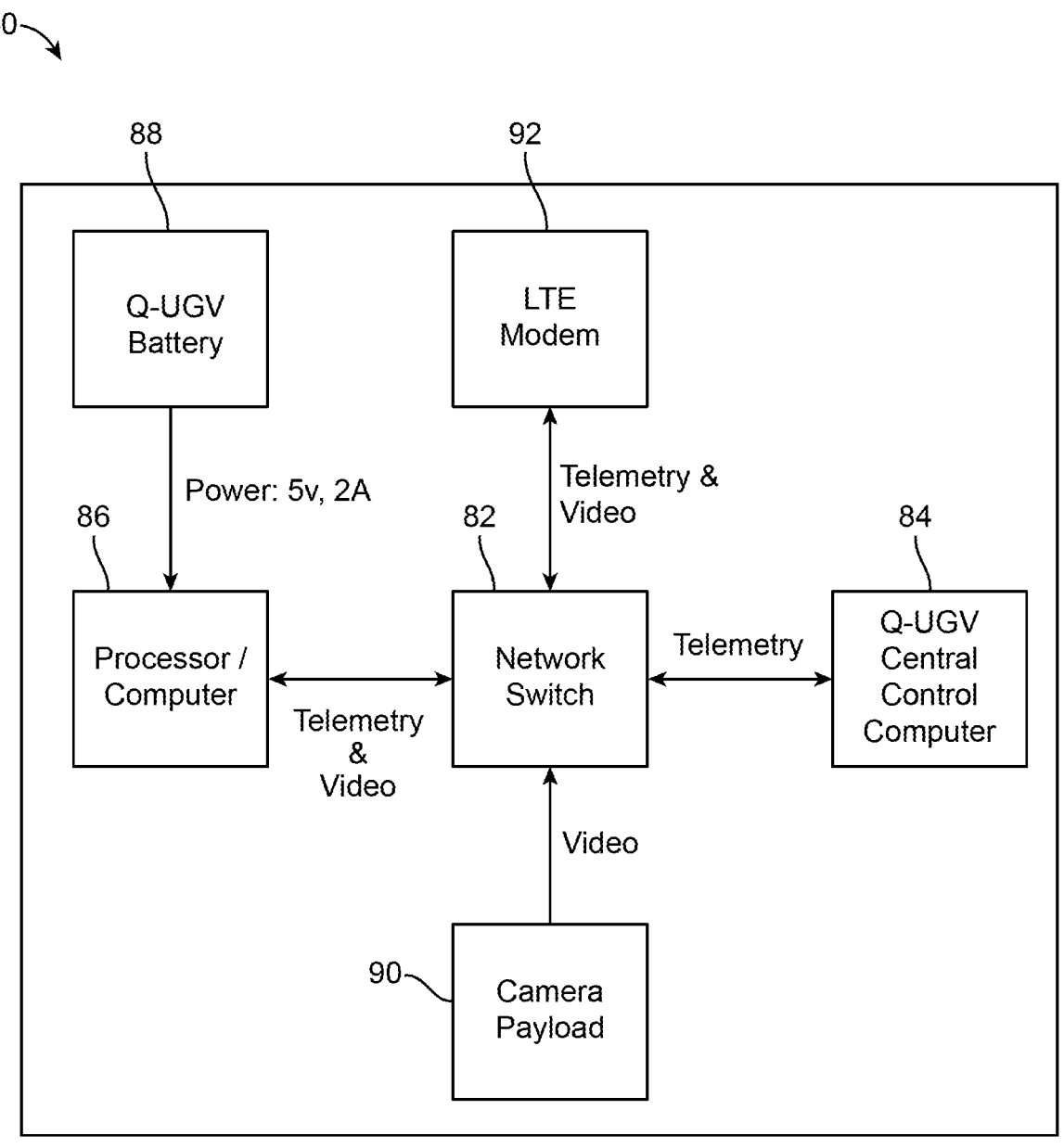
FIG. 5 illustrates a schematic diagram of how a processor or computer may be integrated upon a UGV.

In order to enable command-and-control of the UGV 18 as well as to enable communication and transmission of data such as streaming of telemetry and video from the UGV 18 to the base station 12 or remote server, a processor or computer 86 may be integrated upon the UGV 18 and may be powered directly by the UGV 18 on-board power supply 88 (e.g., 5V, 2 A power line), as illustrated in the schematic diagram 80 in FIG. 5. The processor or computer 86 may enable the receipt of data such as video data from the on-board camera payload 90 and telemetry data from central control computer 84 of the UGV 18 to be routed via an on-board network switch 82 for wireless transmission, e.g., via an on-board LTE cellular modem 92, to communicate with the base station 12 or remote server.

Figure 6:
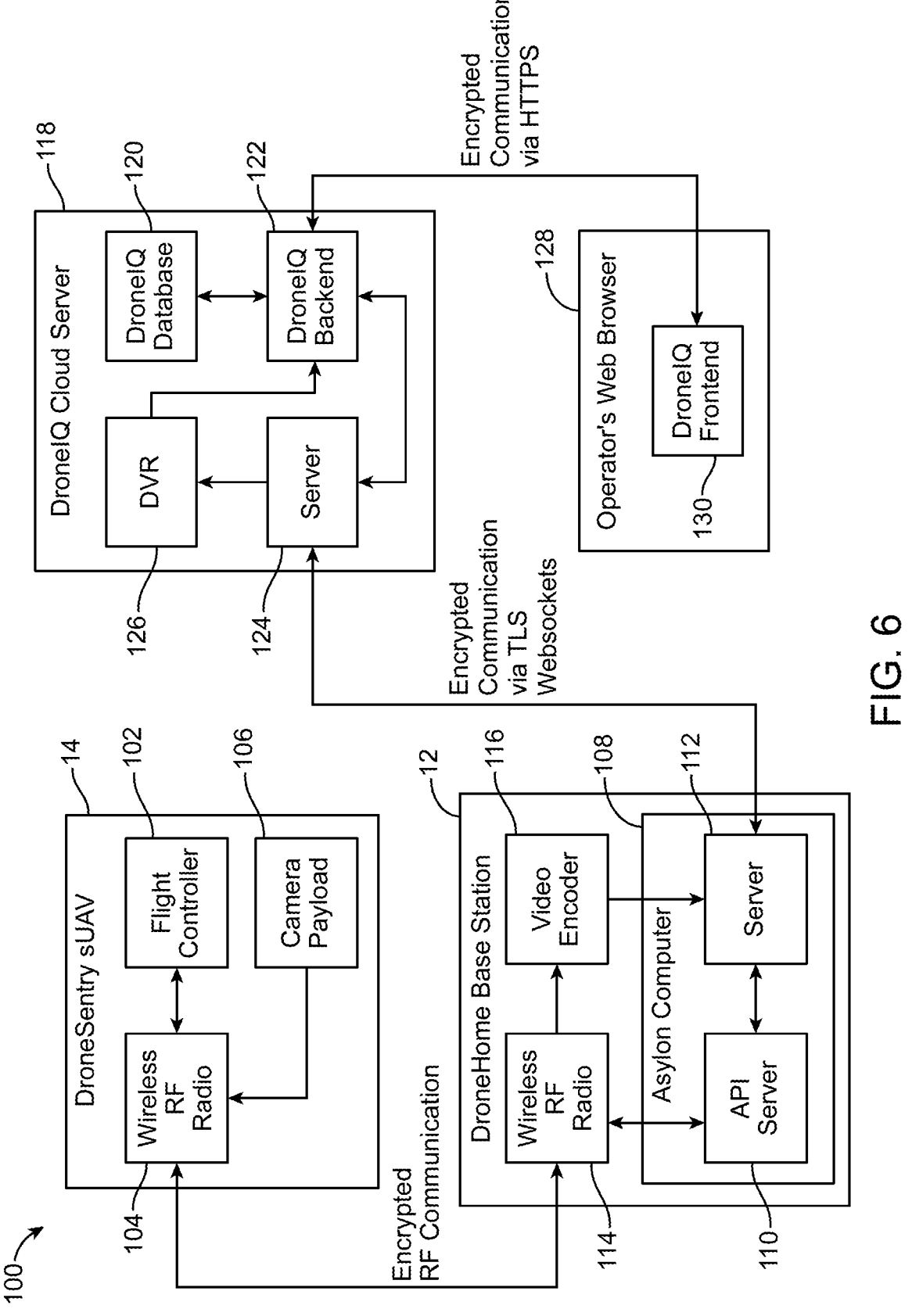
FIG. 6 illustrates a schematic diagram which represents one example of the software architecture showing how the UAV may be controlled and monitored by a human operator.

FIG. 6 illustrates a schematic diagram 100 which represents one example of the software architecture showing how the UAV 14 may be controlled and monitored by a human operator. The flight controller 102 and camera payload 106 of UAV 14 may communicate via encrypted RF communication wirelessly through an on-board wireless RF radio 104 directly with a wireless RF radio 114 contained within the base station 12. The base station 12 may further incorporate a video encoder 116 which may receive video data transmitted from the camera payload 106 of the UAV 14. The video encoder 116 may transmit the video data to the on-board computer 108 in the base station 12 and specifically to a server 112 contained within that utilizes Transport Layer Security (TLS) certificates to establish secure web sockets to enable encrypted communications. The on-board computer 108 may also contain an API server 110 which may also receive the data received from the flight controller 102 of the UAV 14.

With the base station 12 located in the field in proximity to the UAV 14 (and UGV 18 as further described), the local server 112 may enable wireless encrypted communication via the TLS web sockets to a cloud-based server 118 which may be accessed and operated from anywhere in the world so long as the operator has an internet connection. The cloud-based server 118 may receive the telemetry and video data from the server 112 within the base station 12 via a server 124 which may receive the data into a digital video recording (DVR) application 126 in the cloud-based server 118 that receives the video data from the field server 112 and records it to secure storage for streaming and playback. The server 124 may also communication with a cloud-based backend server 122 that sends and receives data between the frontend application 130 through encrypted communications from a remotely located web browser 128 which may be loaded by an operator. The backend server 122 may also communicate with a cloud-based database 120. In this manner, an operator located anywhere in the world may communicate command-and-control data as well as receive telemetry and video data from a remote UAV 14 by communicating through the cloud-based server 124 and field based on-board server 112 located locally within the base station 12.

Figure 7:
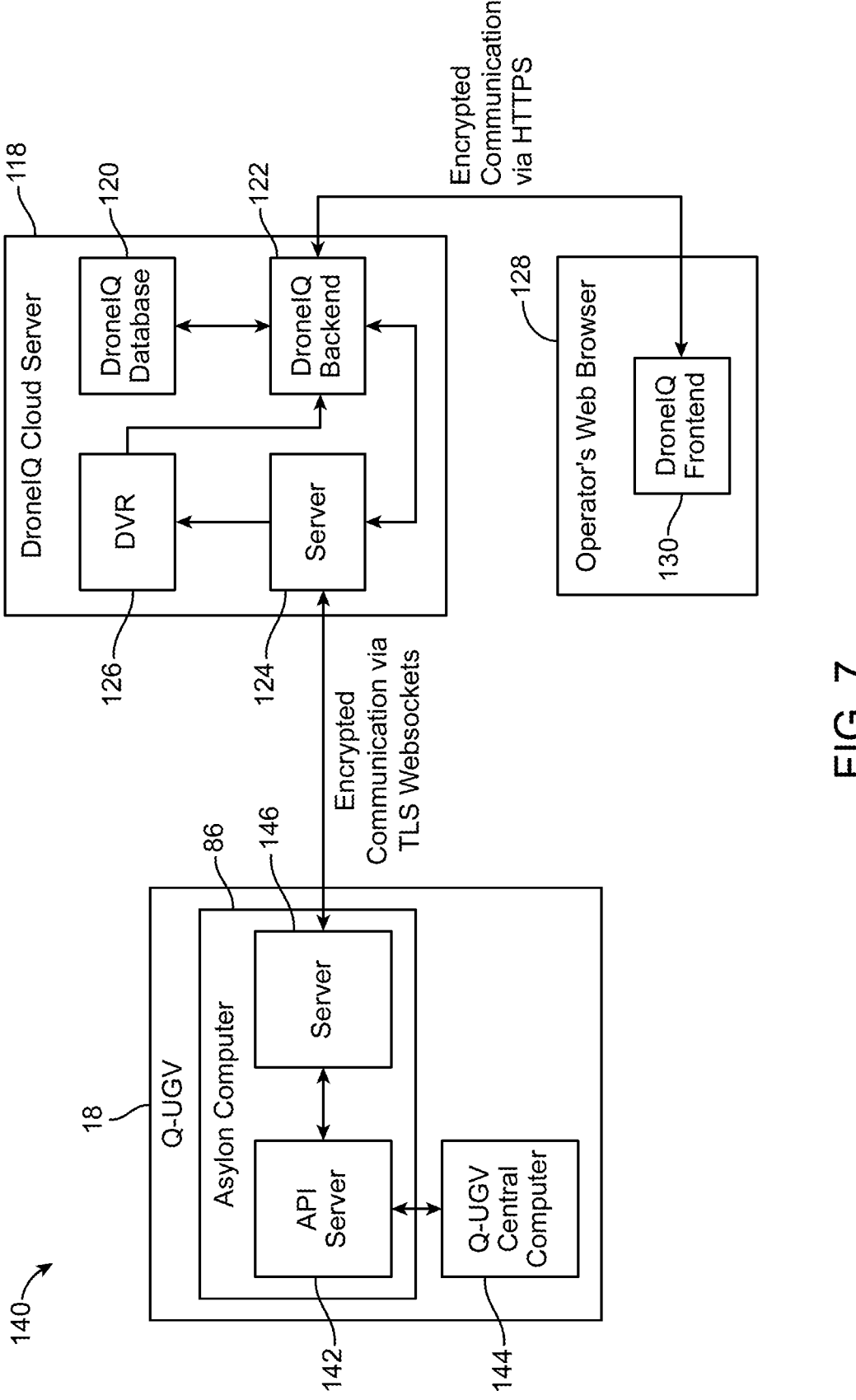
FIG. 7 illustrates a schematic diagram of one example of how the UGV may communicate with a remote operator utilizing the on-board computer integrated with the UGV.

With this architecture, the UGV 18 may similarly communicate with the remote operator utilizing the on-board computer 86 integrated with the UGV 18, as illustrated in the schematic diagram 140 of FIG. 7. With the integrated computer 86, the on-board server 146 may communicate with the integrated API server 142 which may interface directly with the central computer 144 of the UGV 18. The telemetry and video data from the UGV 18 may be communicated through the server 146 of integrated computer 86 directly with the cloud-based server 124 which may then enable a remote operator to provide command-and-control to the UGV 18 as well as receive the telemetry and video data through the frontend application 130, as similarly described above. Alternatively, the UGV 18 may communicate directly with the API server 110 and server 112 within the base station 12 which may in turn communicate with the cloud-based server 124.

Figure 8:
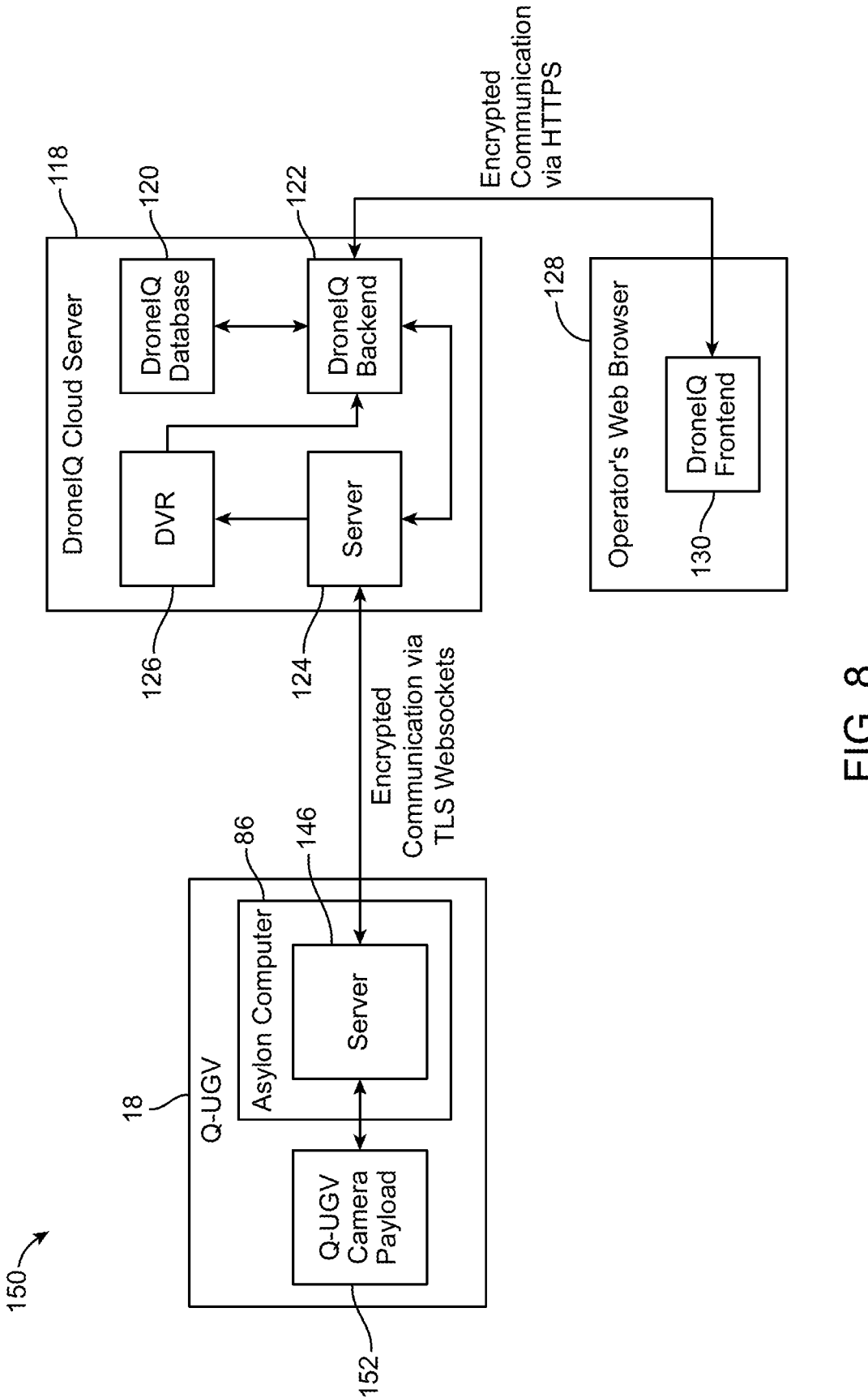
FIG. 8 illustrates a schematic diagram of another example of how the UGV may communicate with a remote operator utilizing the on-board computer integrated with the UGV.

An alternative embodiment for software architecture which may be utilized to extend video streaming from the UGV 18 is shown in the schematic diagram 150 of FIG. 8. Similar to the embodiment described above, the integrated computer 86 within the UGV 18 may be configured to automatically receive video data from the camera payload 152 of the UGV 18 directly to the on-board server 146. The video data may be pushed in real time to the cloud-based DVR application 126 for storage and real-time streaming.

The architecture may be implemented alone or in combination with the telemetry data communication for any of the various embodiments described herein and in any combination, as desired.

The applications of the disclosed invention discussed above are not limited to the embodiments described, but may include any number of other non-flight applications and uses. Modification of the above-described methods and devices for carrying out the invention, and variations of aspects of the invention that are obvious to those of skill in the arts are intended to be within the scope of this disclosure. Moreover, various combinations of aspects between examples are also contemplated and are considered to be within the scope of this disclosure as well.

What is claimed is:

1. A robotic system, comprising:
an unmanned aerial vehicle (UAV) configured with a first predetermined mission profile having one or more predetermined UAV waypoints;
an unmanned ground vehicle (UGV) configured with a second predetermined mission profile having one or more predetermined UGV waypoints;
a base station configured to receive the UAV and replace a spent power supply cartridge from the UAV via an automated exchange mechanism and further having a charging mechanism configured to transfer power to the UGV when the UGV is positioned in proximity to the charging mechanism,
wherein the base station or a controller is programmed to alter the first predetermined mission profile and the second predetermined mission profile to divert the UAV and/or UGV to an area of interest when an external alarm is triggered within the area of interest and received by the base station or controller, whereby an indicator is presented to a human operator for affirmation or selective affirmation to divert the UAV and/or UGV to the area of interest.

2. The system of claim 1 wherein the UAV comprises a drone.

3. The system of claim 1 wherein the UGV comprises a quadrupedal UGV.

4. The system of claim 1 wherein the base station comprises a landing zone configured to receive the UAV.

5. The system of claim 1 wherein the charging mechanism comprises a charging pad.

6. The system of claim 1 wherein the base station comprises a field server for receiving data wirelessly from the UAV or the UGV.

7. The system of claim 6 further comprising a cloud-based server in wireless communication with the field server.

8. The system of claim 7 further comprising a frontend application accessible by an operator and in wireless communication with the cloud-based server.

9. The system of claim 1 wherein the UGV comprises a computer configured to wirelessly communicate with the base station.

10. A method of monitoring an area, comprising:
receiving an alert from a remote alarm;

determining one or more mission requirements based on the alert;

communicating with a UAV and a UGV via a base station, wherein the UAV is configured with a first predetermined mission profile having one or more predetermined UAV waypoints and the UGV is configured with a second predetermined mission profile having one or more predetermined UGV waypoints;

automatically replacing a power supply cartridge from the UAV via an automated exchange mechanism within the base station;

automatically charging the UGV via a charging mechanism in proximity to the base station;

altering the first predetermined mission profile and the second predetermined mission profile to divert the UAV and/or UGV to an area of interest when an external alarm is triggered within the area of interest and received by the base station or controller;

presenting an indicator to a human operator for affirmation or selective affirmation to divert the UAV and/or UGV to the area of interest; and deploying the UAV alone, the UGV alone, or the UAV and UGV simultaneously to the area of interest upon receiving the affirmation or selective affirmation from the human operator.

11. The method of claim 10 wherein deploying the UAV or the UGV comprises communicating with the UAV or the UGV via a server within the base station.

12. The method of claim 11 further comprising wirelessly communicating with the UAV or the UGV via a cloud-based server.

13. The method of claim 12 further comprising wirelessly communication with the cloud-based server via a frontend application.

14. The method of claim 10 wherein deploying comprises launching the UAV or the UGV from the base station.

15. The method of claim 10 wherein deploying comprises altering a mission of the UAV or the UGV.

16. A robotic system, comprising:

an unmanned aerial vehicle (UAV) configured with a first predetermined mission profile having one or more predetermined UAV waypoints;

a quadrupedal unmanned ground vehicle (UGV) configured with a second predetermined mission profile having one or more predetermined UGV waypoints; and, a base station configured to receive the UAV and replace a spent UAV power supply cartridge from the UAV via an automated exchange mechanism, and where the base station is further configured to replace a spent UGV power supply cartridge from the UGV when the UGV is positioned in proximity to the base station, and wherein the base station or a controller is programmed to alter the first predetermined mission profile from the UAV waypoints and the second predetermined mission profile from the UGV waypoints to divert the respective UAV and/or UGV to an area of interest when an external alarm is triggered within the area of interest and received by the base station or controller, whereby an indicator is presented to a human operator for affirmation or selective affirmation to divert the UAV and/or UGV to the area of interest.

* * * * *